United States Patent
Paura et al.

(10) Patent No.: US 9,004,875 B2
(45) Date of Patent: Apr. 14, 2015

(54) FLANGE AND WIND ENERGY SYSTEM

(75) Inventors: Ingo Paura, Meppen (DE);
Vajralingam Bennuri, Andhrapradesh (IN)

(73) Assignee: General Electric Company, Schenectady, NY (US)

( * ) Notice: Subject to any disclaimer, the term of this patent is extended or adjusted under 35 U.S.C. 154(b) by 907 days.

(21) Appl. No.: 13/045,623

(22) Filed: Mar. 11, 2011

(65) Prior Publication Data

US 2011/0223035 A1 Sep. 15, 2011

(51) Int. Cl.
*F03D 11/04* (2006.01)
*E04H 12/08* (2006.01)

(52) U.S. Cl.
CPC .............. *F03D 11/04* (2013.01); *E04H 12/085* (2013.01); *Y02E 10/728* (2013.01); *Y10S 415/908* (2013.01)

(58) Field of Classification Search
USPC ............. 415/4.1, 127, 4.3, 4.5, 905; 416/148, 416/149, 9, 12; 52/40
See application file for complete search history.

(56) References Cited

U.S. PATENT DOCUMENTS

| | | | | |
|---|---|---|---|---|
| 4,961,847 A | * | 10/1990 | Amr | 210/137 |
| 7,109,600 B1 | * | 9/2006 | Bywaters et al. | 290/55 |
| 7,281,902 B2 | * | 10/2007 | Mortensen | 416/244 R |
| 2010/0140948 A1 | * | 6/2010 | Segovia et al. | 290/55 |
| 2010/0295297 A1 | * | 11/2010 | Martin et al. | 285/405 |

* cited by examiner

*Primary Examiner* — Nathaniel Wiehe
*Assistant Examiner* — Michael Sehn
(74) *Attorney, Agent, or Firm* — Global Patent Operation; Douglas D. Zhang

(57) ABSTRACT

A flange is provided including a longitudinal axis defining a first direction, a radial direction being substantially perpendicular to the first direction, a neck extending along the first direction, a flange plate connected to the neck and including a connecting portion adapted for holding a connecting device at a connecting side, the flange plate further including a non-connecting side being at a radially different location than the connecting side; the flange including a first plane defining a first level of the neck, a second plane defining a second level, where flange plate and neck are connected, and a third plane defining a third level of the flange plate, wherein the three planes extend substantially perpendicular to the longitudinal axis of the flange; the flange includes at least at the non-connecting side a bulge, which extends from a level between the first plane and the second plane to the third plane.

20 Claims, 6 Drawing Sheets

FLANGE AND WIND ENERGY SYSTEM

BACKGROUND OF THE INVENTION

The subject matter described herein relates generally to methods and systems for connecting parts of a wind energy system, and more particularly, to methods and systems for connecting parts of a wind energy system by flanges.

At least some known wind turbines include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity.

For mounting wind turbines, different parts are connected to each other. For example, the tower of some wind turbines may consist of several parts due to the size of the wind turbine. These connections may be flanges, which allow a reliable connection between such parts.

However, the connections used for wind turbines have to fulfill several requirements regarding strength, stiffness, durability, and stability. These requirements are adapted to security provisions, the location at which the wind turbine is mounted, the wind conditions at the mounting locations, the size of the wind turbine etc.

As the size of wind turbines increases, the size of some of the components of the wind turbine increases, such as the size of the connecting flanges. Sometimes, flanges connect parts of a wind turbine at locations that are especially sensitive to high loads due to changes in geometry, movements and the like. Thus, an adaption of the flange to the increased load conditions is often required, which also results in an adaption of the parts to be connected by the flange. Often, the adjacent parts are adapted to the design and required size of the flange at least at the respective connection sides, thereby requiring a partly new design of the wind turbine.

BRIEF DESCRIPTION OF THE INVENTION

In one aspect, a flange is provided. The flange including a longitudinal axis includes a neck extending substantially along the longitudinal axis of the flange defining a first direction; and a flange plate being connected to the neck and including a connecting portion at a connecting side. The connecting portion of the flange plate is adapted for holding a connecting device. The flange plate further includes a non-connecting side, which is at a radially different location than the connecting side. Further, the flange includes a first plane defining a first level of the neck, a second plane defining a second level, where the flange plate and the neck are connected, and a third plane defining a third level of the flange plate. The first, second, and third plane extend substantially perpendicular to the longitudinal axis of the flange. The flange includes at least at the non-connecting side a bulge, wherein the bulge extends from a fourth level, which is located between the first plane and the second plane to the third plane.

In another aspect, a flange is provided. The flange includes a neck including an outer side, wherein the neck is adapted for being connected to a flange plate; a flange plate including inwardly facing connecting portions adapted for holding a connecting device; and an inner side and an outer side of the flange, wherein the inner side of the flange is located at a radially different location than the outer side of the flange. Further, the outer side includes a bulge defining a second diameter 901 different from a first diameter 900 of the outer side of the neck.

In yet another aspect, a wind energy system is provided. The wind energy system includes a tower adapted for being connected to a nacelle of the wind energy system; a yaw bearing on top of the tower; and a flange located between the yaw bearing and the tower. The flange includes a neck extending substantially along a longitudinal axis of the flange defining a first direction; and a flange plate being connected to the neck and including a connecting portion at a connecting side. The connecting portion of the flange plate is adapted for holding a connecting device. The flange plate further includes a non-connecting side, which is at a radially different location than the connecting side. Further, the flange includes a first plane defining a first level of the neck, a second plane defining a second level, where the flange plate and the neck are connected, and a third plane defining a third level of the flange plate. The first, second, and third plane extend substantially perpendicular to the longitudinal axis of the flange. The flange includes at least at the non-connecting side a bulge, wherein the bulge extends from a level between the first plane and the second plane to the third plane.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Embodiments described herein include a wind turbine system that provides an improved stress flow in regions where a flange is used to connect parts of the wind energy system. More specifically, embodiments described herein provide a flange which allows an improved stress distribution while using the same or less amount of raw material and causing the same or less manufacturing costs compared to flanges having a lower stress performance. The flange as described in embodiments herein provides a higher stress performance without requiring adaption of the adjacent parts or parts to be connected by the flange.

As used herein, the term "flange" is intended to be representative of a connecting device for connecting parts. The parts to be connected may be in the shape of a tube, a ring, a substantially circular device or the like. The connecting device may be adapted to be used in wind energy systems, such as for connecting parts of the tower of a wind energy system. According to some embodiments, the flange may also be used to connect at least a part of a tower of a wind energy system with a bearing of a wind energy system. Further, the flange may be used to connect at least a part of the tower to the nacelle of the wind energy system. Also, the flange may be used to connect segments of a tower. The flange as described herein may be used in wind energy systems, but may also be applicable for other technologies using flanges.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
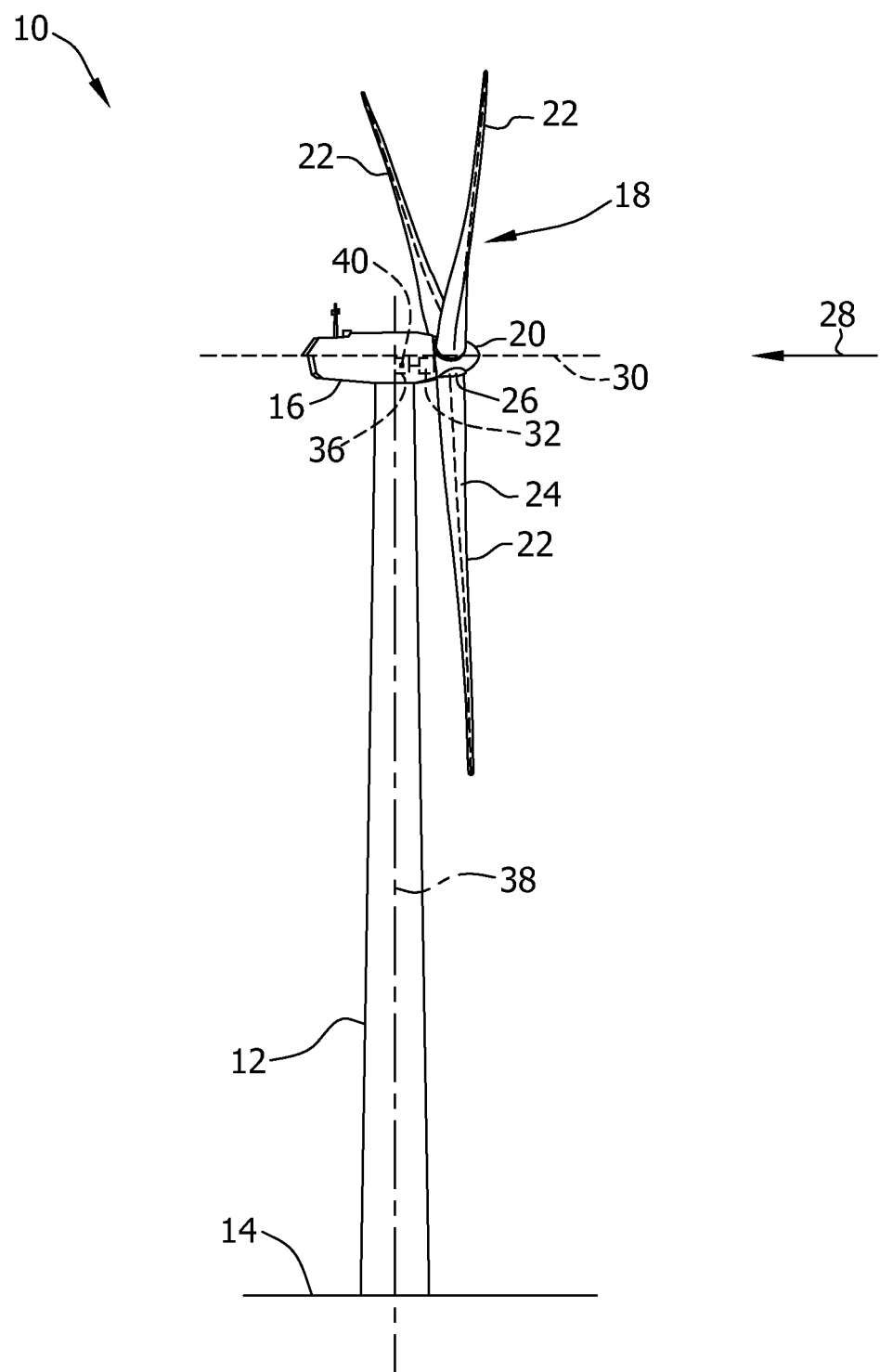
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In an embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 100 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (or non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Nacelle 16 also includes a yaw drive mechanism (not shown) that may be used to rotate nacelle 16 and hub 20 on yaw axis 38 to control the perspective of rotor blades 22 with respect to direction 28 of the wind. Nacelle 16 also includes at least one meteorological mast (not shown) that includes a wind vane and anemometer. The mast provides information to control system 36 that may include wind direction and/or wind speed. The nacelle is mounted on a yaw bearing allowing the rotation of the nacelle around the yaw axis 38.

Typically, the yaw bearing is connected to the tower of a wind energy system by a flange. The flange connecting the yaw bearing and the tower is also referred to as top flange of a wind energy system. The top flange is exposed to high loads due to the load transmission caused by the rotational movement of the nacelle and the rotor. An increased rotor diameter (for instance from about 80 m to about 100 m) also results in an increased load level in the yaw bearing and the top flange. In this situation, it is desirable that the flange component is adapted to the higher load.

In known wind energy systems, solutions for the increased load consists for example of redesigning and changing the concept of the yaw bearing to reduce eccentricity of the load introduced from the yaw bearing to the top flange of the tower, increasing the outer diameter of the yaw bearing and the top flange, tower shell and designing other components like mainframe and nacelle accordingly, or significantly increasing thickness of the flange, especially the length of the flange neck.

However, for load increases of up to 75%, which may occur by increasing the rotor diameter by an amount of a few meters (such as about 20 m in the above example), these concepts are not applicable within desired dimensions of the redesigned parts. Further, the design and reconstruction of a wind energy system having a new tower and a new yaw bearing for the increase of the rotor blade diameter is expensive and time-consuming.

Thus, it is desirable that the outer diameter of the top flange does not change despite the increased load.

The flange according to embodiments described herein allows for keeping the diameter of the tower and the flange on the level of existing wind energy systems as well as keeping the designs of other components (such as yaw bearing, mainframe, nacelle etc.) almost the same at an increased load level compared to known systems. Typically, the flange described herein also overcomes the need for more material usage in relation to the load increase. The embodiments described herein provide a flange design that reduces stresses in the flange (for instance, on the inside of the flange) and improves overall stress distribution in the flange.

Figure 2:
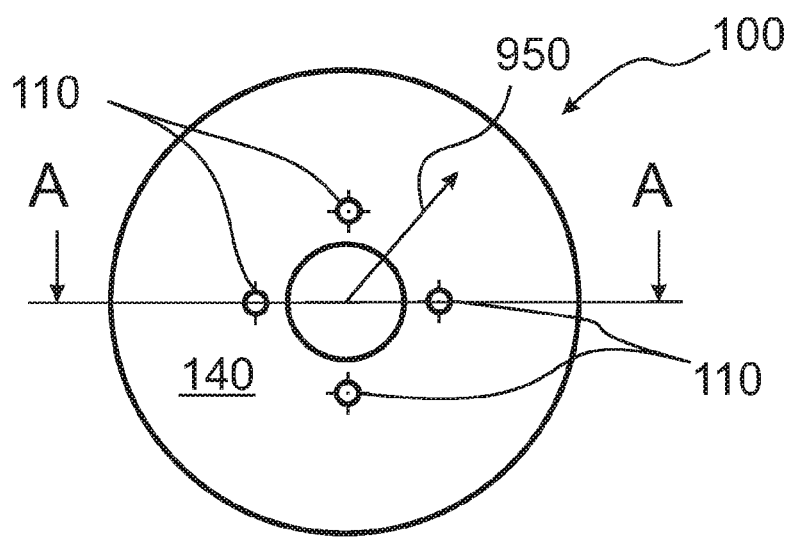
FIG. 2 is a top view of a flange according to embodiments described herein.

FIG. 2 shows a top view of a flange according to embodiments described herein. Typically, flange 100 has a substantially circular shape, as can be seen in the top view of FIG. 2.

The term "substantially circular" means that the shape of the flange may deviate from the circular shape to a certain extent. For instance, due to constructional tolerances, the shape may deviate from the circular shape at some locations of the flange. Typically, the shape of the flange may also deviate from the circular shape due to constructional or manufacturing considerations.

According to some embodiments, the flange as described herein may have any shape, which is suitable for connecting parts to be connected by the flange. For instance, the flange may have a shape that is rather elliptical than circular. According to further embodiments, the shape of the flange may be rectangular or the like. Generally, the shape of the flange is dependent on the parts to be connected by that flange and by the load being present at the location of the connection. For the sake of conciseness, the shape of the flange is shown to be substantially circular in the following described drawings without being limited to a special shape.

Four connecting portions 110 are exemplarily shown in FIG. 2. The connecting portions 110 are shown as through-holes, as becomes apparent from the sectional view along line A-A in FIG. 3 and the bottom view of FIG. 4. The through-holes may be adapted for holding connecting devices.

According to some embodiments, the connecting portions as described herein may be threaded holes and the connecting devices may be screws. Also, the through-holes may be holes adapted to hold a connecting device such as a bolt. Further connecting portions and corresponding connecting devices may be used, which are suitable to fix the flange to at least one of the parts to be connected.

Typically, the number of connecting portions is dependent on the load case and the size of the flange. For instance, the number of connecting devices may be greater than four, such as five, eight, ten or even more than ten. Typically, the number of connecting portions of a flange used in tower sections of a wind energy system is between about 10 and 200, more typically between about 30 and 180 and even more typically between about 50 and 160. According to other embodiments, the number of connecting devices may be less than four such as three or two.

Figure 3:
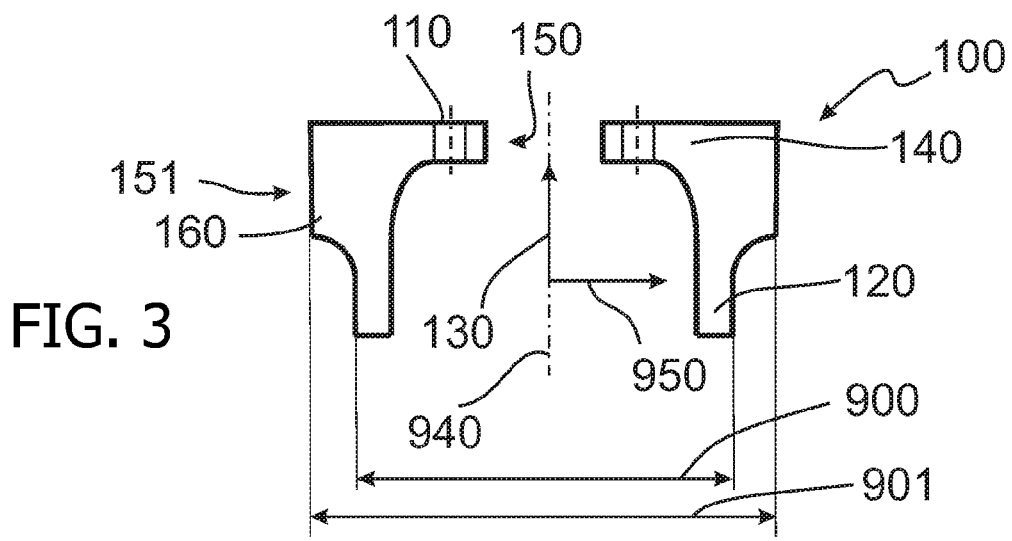
FIG. 3 is a sectional view of the flange of FIG. 2 along line A-A shown in FIG. 2 according to embodiments described herein.
Figure 4:
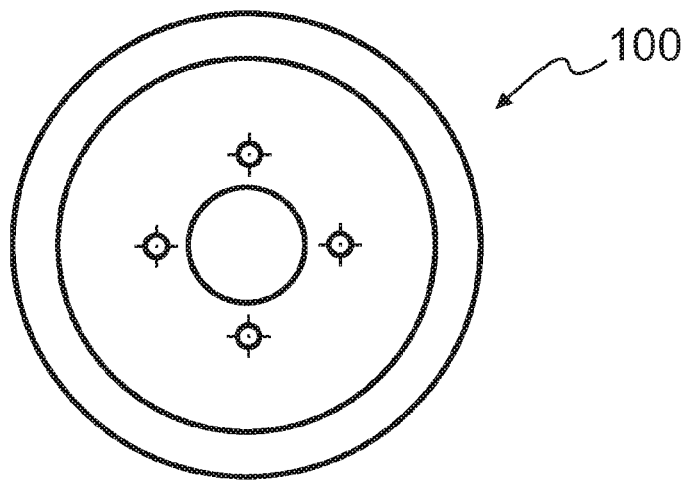
FIG. 4 is a bottom view of the flange shown in FIGS. 2 and 3 according to embodiments described herein.

The sectional view of FIG. 3 shows a section of the flange of FIG. 2 across line A-A. The flange has a longitudinal axis 940. Typically, a first direction 130 is defined by the longitudinal axis 940. Further, the flange shown in FIG. 3 has a neck 120, which extends substantially along and around the longitudinal axis 940.

The term "substantially along" in this context means that the neck may be formed so that it extends not exactly along the longitudinal axis. For instance, the neck may be formed so that only a portion of the neck extends along the longitudinal axis. According to a further example, the neck may be formed so that the longitudinal axis of the neck forms an angle with respect to the longitudinal axis of the flange. Typically, this angle may be small, such as between about 0.1° to about 5°. Typically, the neck may be formed so that it deviates from the direction along the longitudinal axis, which may be due to constructional or manufacturing considerations, or due to constructional tolerances.

The neck of the flange according to embodiments described herein may be adapted for being connected to a part of a wind energy system. For instance, the neck may be connected to a tower or tower segment. According to some embodiments, the neck of the flange may be welded to the tower, as will be shown and described in detail below.

In FIGS. 2 and 3, also a radial direction 950 can be seen, which extends substantially perpendicular to the first direction. According to some embodiments, the radial direction extends from the longitudinal axis 940 to the circumference of the flange. Typically, the radial direction 950 is substantially perpendicular to the first direction 130.

The term "substantially perpendicular" in this context means that the angle between the directions being denoted as substantially perpendicular may deviate from a right angle to a certain degree.

According to some embodiments, the flange 100 provides a flange plate 140. The flange plate 140 is adapted to be connected to the neck 120. According to some embodiments, the flange plate 140 and the neck are integrally formed to form flange 100 in one piece. The flange plate 140 includes the above described connecting portions 110.

Typically, the flange plate 140 includes a connecting side 150 and a non-connecting side 151. According to some embodiments, the connecting side 150 is a side of the flange 100, which includes the connecting portions 110. The non-connecting side 151 is a side of the flange which does not include the connecting portions 110 and which is arranged at a radially different location from the connecting side. For instance, the non-connecting side 151 may be at a radially more outward position than the connecting side 150. In other words, the non-connecting side 151 has a greater value on the radial axis 950 than the connecting side 150.

According to some embodiments, the connecting side may be the inner side of the flange with respect to a radial position. Typically, the non-connecting side may be the outer side of the flange. The arrangement with the connecting side being the inner side is shown as a mere example in FIG. 3.

The connecting portions as shown in some embodiments described herein may exemplarily be described as facing inwardly. The term "inward" as used herein may be understood as denoting the direction from the circumference of the flange to the longitudinal axis along the radial direction.

Typically, the flange 100 of FIG. 3 shows a bulge 160 on the non-connecting side 151. Typically, the bulge 160 extends in the first direction 130 from the neck 120 to the flange plate 140. In the radial direction 950, the bulge includes an outer diameter 901 different from a first diameter 900 of the neck 120. According to some embodiments, first diameter 900 is the diameter of the outer side of the neck 120 at a location, where the bulge 160 has not yet begun.

According to some embodiments, the flange includes an inner side and an outer side of the flange, wherein the inner side is located at a radially different location than the outer side. The flange includes a flange plate and a neck. Typically, the flange plate of the flange includes connecting portions at exactly one of the inner side and the outer side. The side including the connecting portions may be denoted as connecting side. The connecting portions are adapted for holding a connecting device. The other side of the inner and outer side of the flange provides a bulge. The other side may be denoted as non-connecting side. Typically, the other side providing the bulge does not include any connecting portions. The bulge defines a second diameter 901 different from a first diameter 900 of the neck at the side providing the bulge.

Figure 5:
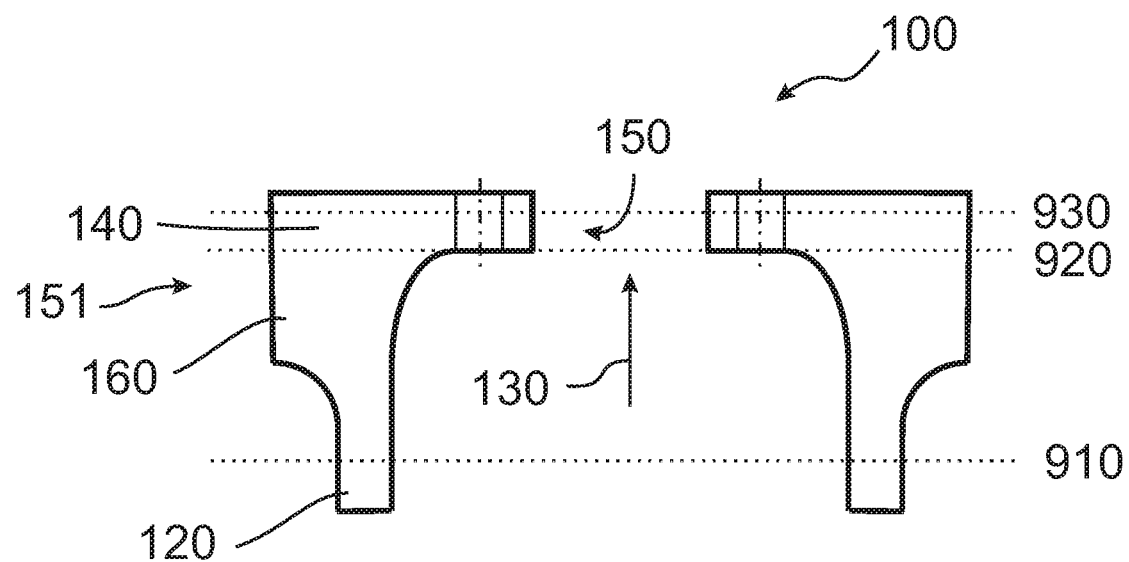
FIG. 5 shows a sectional view of a flange and corresponding planes according to embodiments described herein.

In FIG. 5, three planes 910, 920, and 930 are shown. The first plane 910 defines a first level of the neck 120. The level of the first plane 910 of the neck 120 may be chosen according to the purposes of the flange 100. The second plane 920 defines a second level, where the flange plate 140 and the neck 120 are connected. In this case, the neck 120 and the flange plate 140 are integrally formed. The second plane 920 defines the second level, where the neck merges into the flange plate 140. According to embodiments described herein, the flange plate 140 and the neck 120 may merge in a continuous manner, as can be seen in FIG. 5. In this case, the second plane 920 is defined as lying on the bottom side of the flange plate 140 along the first direction 130 of the flange 100. The third plane 930 is defined as lying in a third level of the flange plate 140. According to some embodiments, the planes 910, 920, and 930 are substantially perpendicular to the longitudinal axis 940 of the flange 100.

FIG. 5 shows a continuous merging of the neck 120 and the flange plate as well as of the neck 120 and the bulge 160 at the non-connecting side 151.

In this context, the term "continuous" or "in a continuous manner" should be understood as being not interrupted by a sudden geometry change. In other words, the term "continuous" can be understood as being "continuously differentiable." Typically, the merging of the neck and the flange plate may have any suitable shape, such as circular or elliptical, as exemplarily shown in FIG. 5. According to some embodiments, the merging of the neck and the bulge may have any suitable shape, such as circular or elliptical. A circular merging of the neck and the bulge is exemplarily shown in FIG. 5. Typically, the radius of the merging may vary according to the construction and the operation conditions of the flange.

Figure 6:
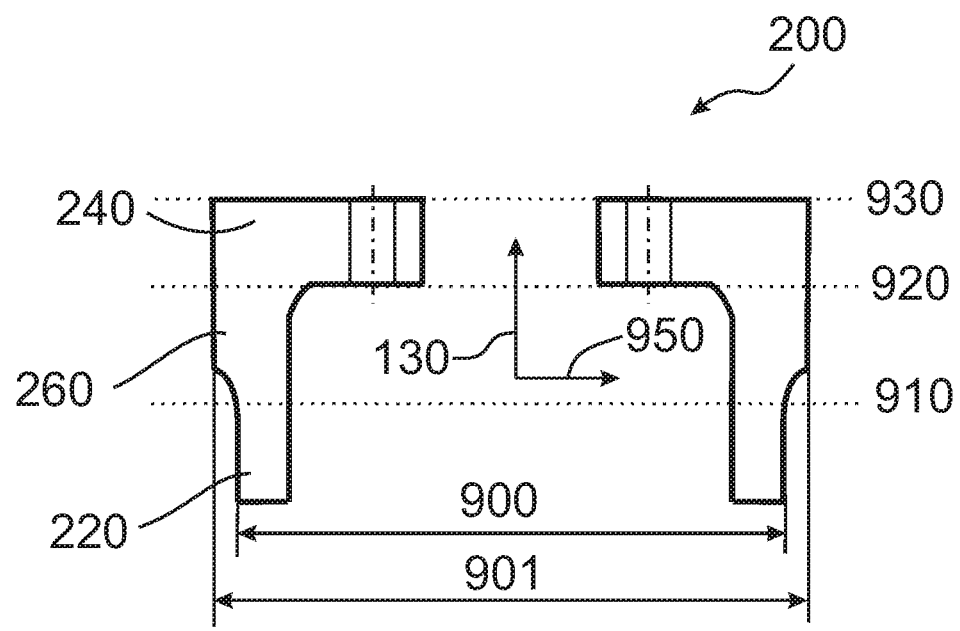
FIG. 6 shows a sectional view of a flange and corresponding planes according to embodiments described herein.

FIG. 6 shows an example of a flange 200, where the merging from the neck 220 to the flange plate 240 as well as the merging of the neck 220 to the bulge 260 is in an elliptical manner. FIG. 6 also shows the planes 910, 920, and 930. According to some embodiments, the bulge 260 of FIG. 6 begins at the level of the first plane 910. As can be seen in FIG. 6, the bulge 260 begins, where the elliptical merging of the neck 220 to the bulge 260 begins. The onset of the bulge 260 may also be denoted as a starting location of the bulge 260. Typically, the bulge 260 continues to the third plane 930, which is exemplarily at the top side of the flange plate 240 in the first direction 130 of flange 200.

According to some embodiments, the bulge 260 of FIG. 6 includes an outer diameter 901 different from a diameter 900 of the neck 220 below the level of the first plane 910.

Typically, the term "bulge" as used herein should be understood as being a part of the flange extending in the radial direction 950. Thus, the bulge increases the extension at the respective side of the flange in radial direction. For instance, if the bulge is located at the non-connecting side being exemplarily the outer side of the flange, the bulge will increase the outer diameter of the flange.

According to some embodiments, the bulge increases the extension of the flange on the respective side in radial direction by an amount of typically about 0.1% to about 10%, more typically about 0.2% to about 5%, and even more typically about 0.3% to about 3% of the extension of the neck of the flange. For instance, diameter 901 is typically about 0.1% to about 10%, more typically about 0.2% to about 5%, and even more typically about 0.3% to about 3% greater than first diameter 900.

The relations of the different portions of the flange to one another are described as mere example in the above description. Also, the drawings show schematic drawings. The proportions of the flange according to embodiments described herein may be adapted to the requirements of the operation conditions of the flange, such as load, size of parts to be connected, size of the wind energy system and the like.

Figure 7:
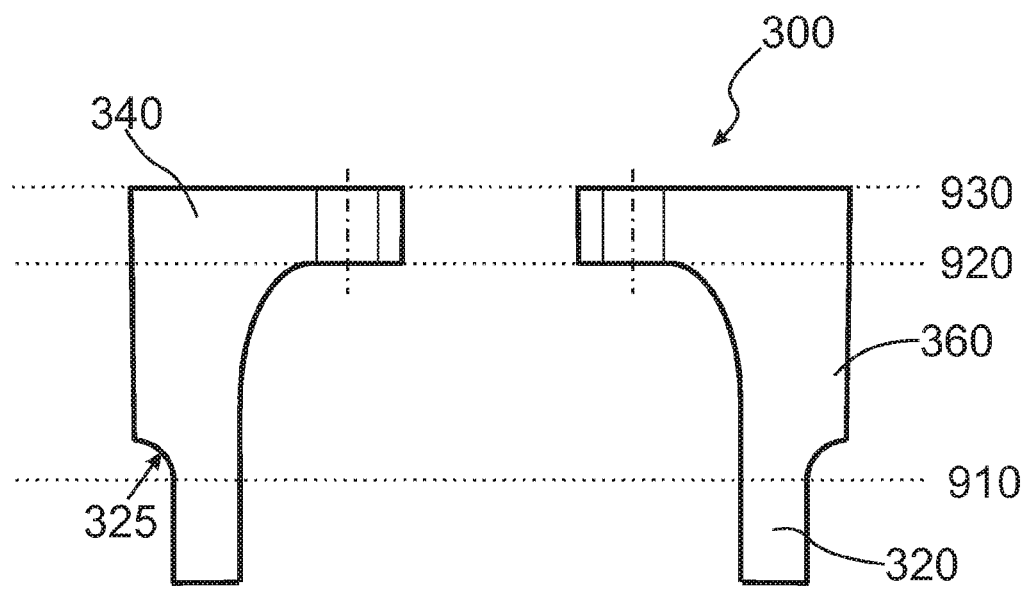
FIG. 7 shows a sectional view of a flange and corresponding planes according to embodiments described herein.

For instance, FIG. 7 shows an embodiment of a flange 300. Again, planes 910, 920, and 930 are shown. Further, the embodiment of FIG. 7 shows the merging of the flange neck 320 to the bulge 360 in a substantially circular shape, providing a defined radius 325.

The radius of the merging of the neck to the bulge may be chosen according to the corresponding geometrical conditions. For instance, the radius may be typically between about 2 mm and about 40 mm, more typically between about 5 mm and about 30 mm, and even more typically between about 8 mm and about 20 mm.

Typically, the merging of the flange neck 320 to the flange plate 340 has a substantially elliptical shape.

Figure 8:
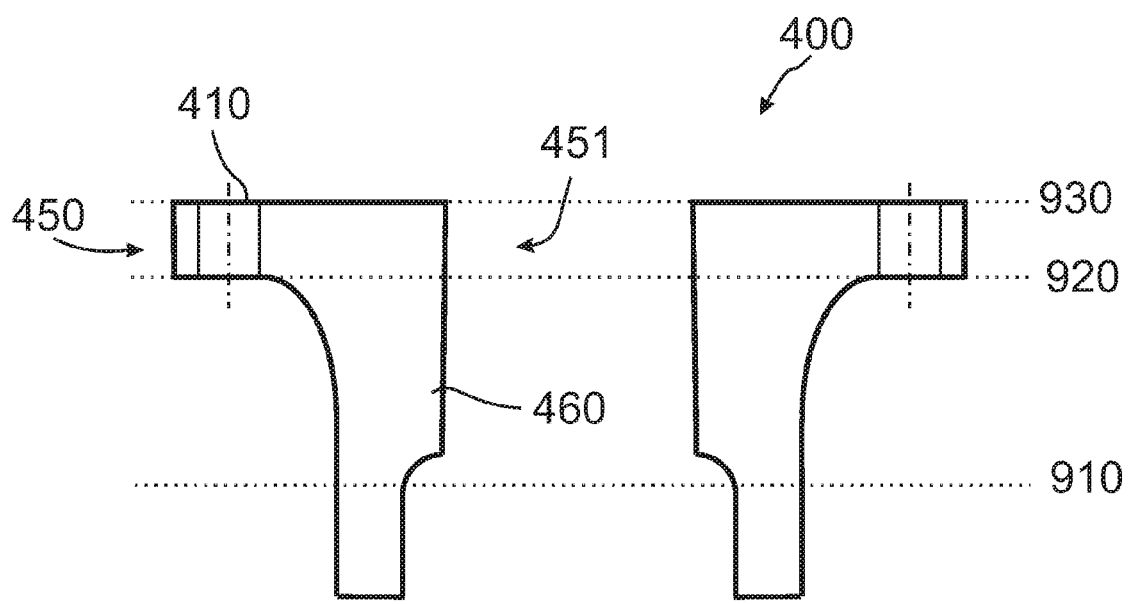
FIG. 8 shows a sectional view of a flange according to embodiments described herein.

FIG. 8 shows an embodiment of a flange 400 as described herein. In the embodiment of FIG. 8, the connecting side 450 is the outer side and the non-connecting side 451 is the inner side. Planes 910, 920, and 930 can be seen as described above. Bulge 460 extends from the non-connecting side 451 of the flange 400. The connecting side 450 includes connecting portions 410. The connecting portions 410 may be constructed as described above.

Figure 9:
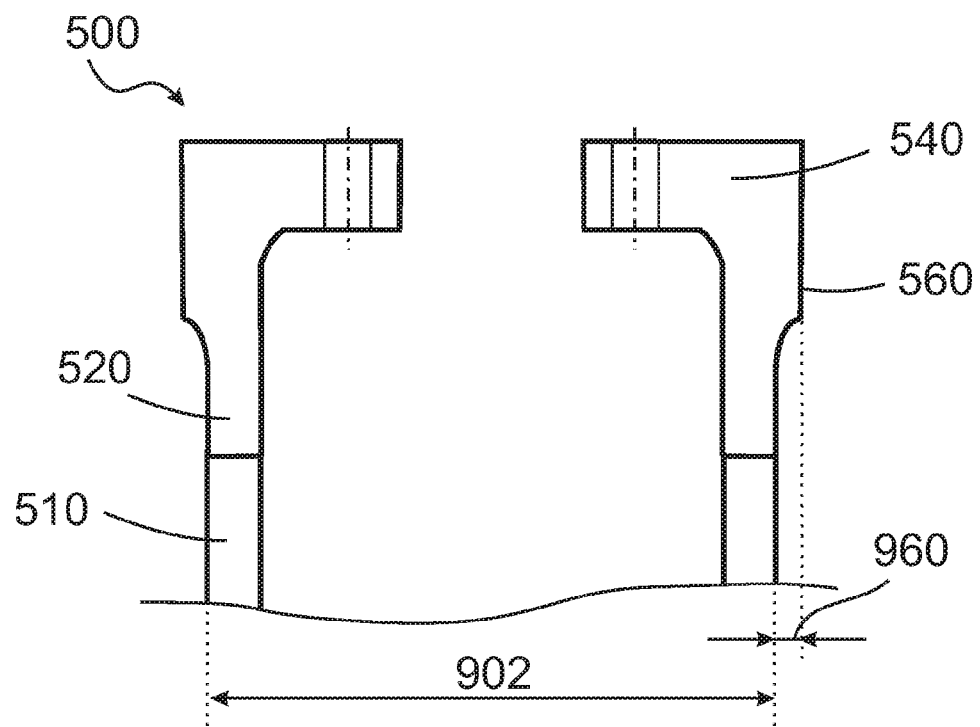
FIG. 9 shows a sectional view of a flange on a tower segment according to embodiments described herein.

FIG. 9 shows a flange 500 as described above, which is connected to a tower 510. Typically, the tower 510 may be a tower of a wind energy system. The flange 500 may be connected at the neck 520 to the tower 510. For instance, the flange 500 may be welded to the tower 510.

According to some embodiments, which can be combined with other embodiments described herein, the flange may be comprised of steel, such as constructional steel or the like.

The extension 960 of the bulge 560 of flange 500 can be seen in FIG. 9.

As an example, the extension 960 of the bulge 560 may be typically between about 10 mm and about 50 mm, more typically between about 15 mm and about 40 mm, and even more typically between about 20 mm and about 30 mm at an outer diameter 902 of the neck 520 of about 2500 mm. According to some embodiments, the extension 960 of the bulge 560 may be typically between about 2.5 mm and about 250 mm, more typically between about 5.0 mm and about 125 mm, and even more typically between about 7.5 mm and about 75 mm at an outer diameter 902 of the neck 520 of about 2500 mm.

According to some embodiments, the thickness of the flange as described herein in the first direction may be reduced along with the extension of the bulge.

Figure 10:
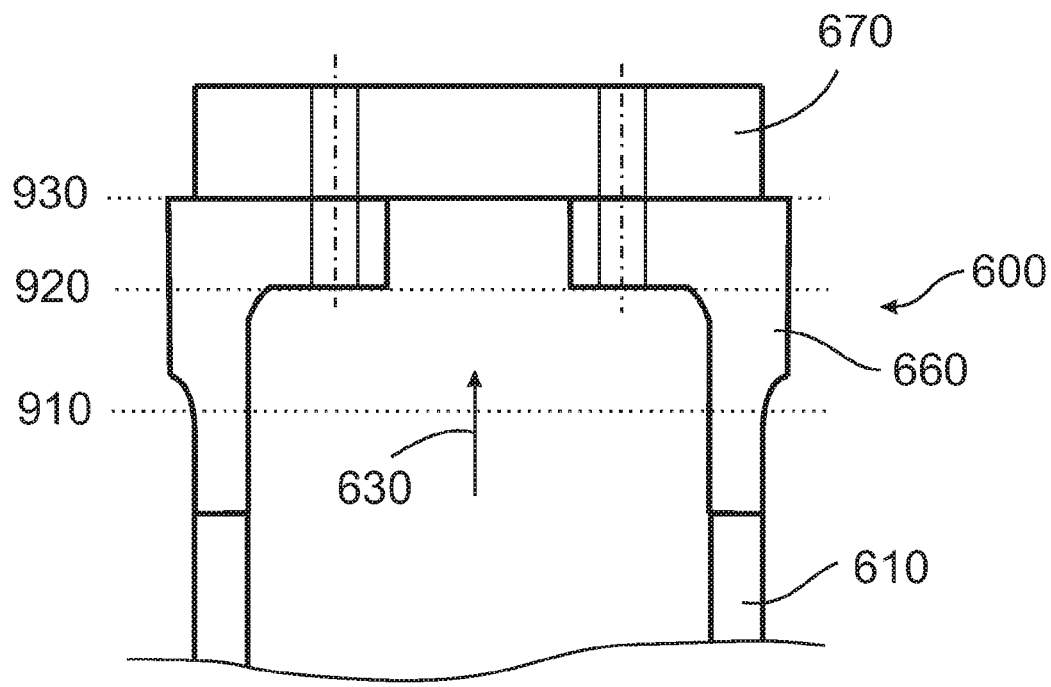
FIG. 10 shows a sectional view of a flange between a tower segment and a bearing according to embodiments described herein.

FIG. 10 shows an example of the application of the flange as described herein. Flange 600 is connected to a tower 610 of a wind energy system. The wind energy system may be a wind energy system as described with respect to FIG. 1. The flange 600 is connected to a yaw bearing 670 of the wind energy system. The yaw bearing 670 allows the nacelle of the wind energy system to rotate around the yaw axis (axis 38 in FIG. 1). The flange 600 of FIG. 10 provides the connection between the tower 610 and the yaw bearing 670 of the wind energy system. Planes 910, 920, and 930 show the extension of the bulge 660 in the first direction.

Figure 11:
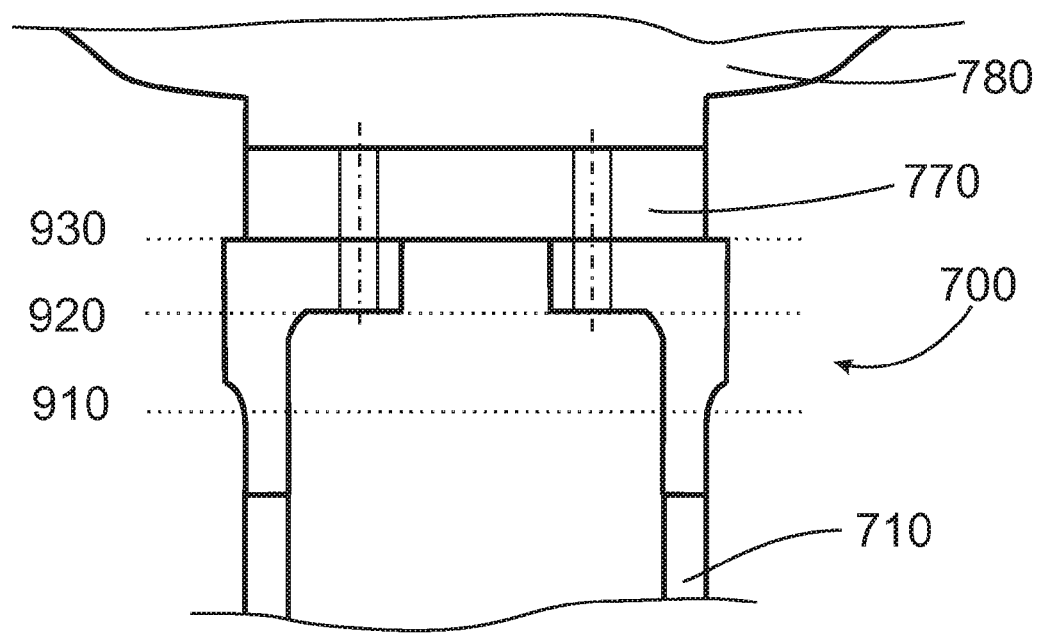
FIG. 11 shows a sectional view of a flange in a wind energy system according to embodiments described herein.

FIG. 11 shows a flange 700 as described herein, which is connected to a tower 710 of a wind energy system. The flange 700 is used to connect the top of the tower 710 with the yaw bearing 770 of the wind energy system. Also, the lower part of the nacelle 780 is shown in FIG. 10. The nacelle 780 is situated on the yaw bearing 770. The nacelle 780 can be rotated on the yaw bearing 770 with respect to the tower 710.

Figure 12:
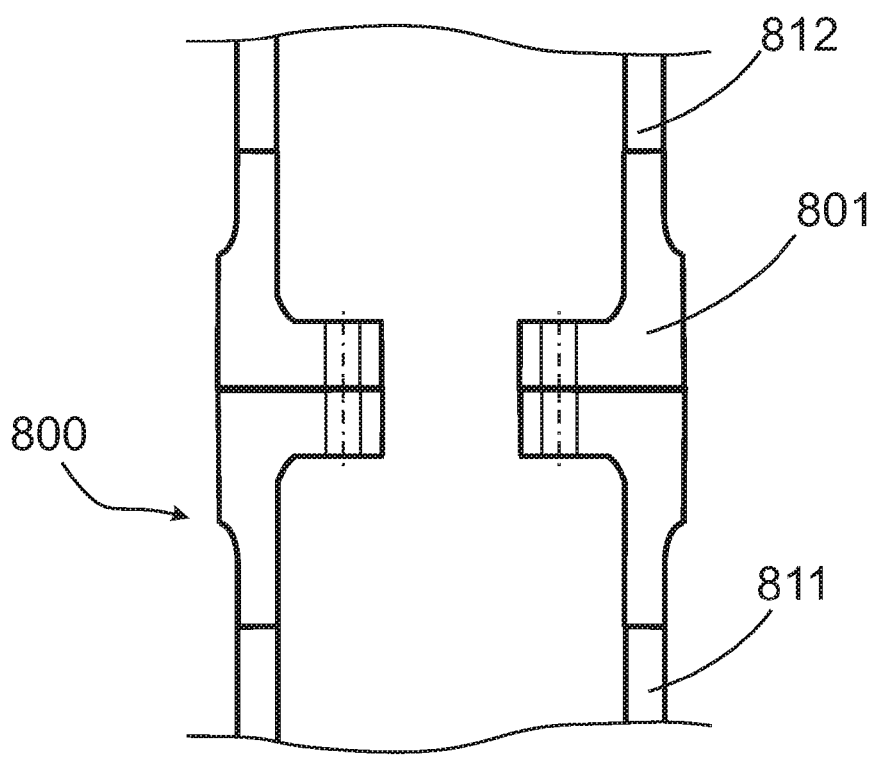
FIG. 12 shows a sectional view of a flange between tower segments according to embodiments described herein.

FIG. 12 shows yet another use of the flange as described above. The flange 800 is provided to be connected to another flange 801. Both flanges 800 and 801 are connected to segments 811, 812 of a tower. According to embodiments described herein, the tower may be a tower of a wind energy system.

Typically, the flanges described herein may be used in wind energy technology, but also in other technologies using flanges. The flanges described herein may be suitable for load cases, where the load is eccentrically introduced into the flange in combination with high fatigue. Further, the flanges described herein may be used for critical load changes for achieving a desired load distribution.

The above-described systems and methods facilitate design and constructions of wind energy system having increasing loads. By adding material at one side of a flange, such as the outside of a top flange of a wind energy system, which is connected to the yaw bearing, the stress flow and the overall distribution of stress are improved. The overall size (for instance, the thickness and the flange neck length) can be reduced compared to known flange designs. The flange design with the improved geometry allows the flange to resist higher extreme and fatigue loading at the same or lower raw material usage and the same manufacturing costs. Thus, an improved fatigue and extreme load resistance result without additional costs, or at even lower costs.

The different shape of the flange at one side, for instance, the outside of the top flange of a wind energy system, improves the stress flow and re-distribution of stresses. By the described design of the flange, the load distribution becomes smoother in the flange. This means, the load peaks are not as high as in known flanges and the load is distributed in a larger area of the flange. For instance, the distribution of the load in the area of the flange fillet and the weld location joining the flange neck and the tower shell is improved by the above described flange design. Thus, the outer diameter of the tower can be maintained at a level used for wind energy systems providing lower load cases (for instance due to smaller rotor blade diameters) for a wind energy system with high load cases (for instance due to an increase of the rotor blade diameter from about 80 m to about 100 m).

Although the design of the described flange provides added material at one side of the flange, the overall material usage can be substantially maintained due to the improved load distribution. Relatively spoken, less material is used per load unit. The thickness of the flange may be reduced accordingly. According to other embodiments, the thickness of the flange as described herein may not be reduced, thereby providing an even more improved stress resistance. According to yet other embodiments, the thickness of the flange as described herein may be increased. By increasing the thickness of the flange of the described design, even more load can be carried by the flange. The thickness of the flange is chosen according to the respective load case and the conditions for use.

Further, due to the improved load distribution and the resulting lower load peaks, the outer diameter of the flange can be maintained from former designs. This means that the adjacent components do not have to be redesigned for the new load case. This results in a cost saving for a whole series of wind energy systems having different load cases, but similar design.

Furthermore, no change in the process of manufacturing of the described flange, for instance a top flange of a wind energy system, is to be made from a manufacturing point of view. Only the machining sequence is changed which has limited impact on the manufacturing process. This means, also the manufacturing of the described flange itself does not cause additional costs for a higher load resistance of the flange.

In view of the above, the described flange design can be used for wind energy systems with increased rotor diameter, such as rotor diameters up to 100 m or greater.

Exemplary embodiments of systems and methods for a flange are described above in detail. The systems and methods are not limited to the specific embodiments described herein, but rather, components of the systems and/or steps of the methods may be utilized independently and separately from other components and/or steps described herein. For example, the described flange is not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flange including a longitudinal axis, comprising:
   a neck extending substantially along the longitudinal axis of the flange defining a first direction;

a flange plate connected to the neck and including a connecting portion configured to hold a connecting device at a connecting side, the flange plate further including a non-connecting side being at a radially different location than the connecting side;

the flange including a first plane defining a first level of the neck, a second plane defining a second level where the flange plate and the neck are connected, and a third plane defining a third level of the flange plate, wherein the first plane, the second plane and the third plane extend substantially perpendicular to the longitudinal axis of the flange; and a ring-shaped bulge on the non-connecting side of the flange, wherein the bulge extends from a fourth level of the neck to the third plane, the fourth level being located between the first plane and the second plane, a merge point of the bulge and the neck comprises a flange fillet, and an outer diameter of the bulge is substantially constant along the non-connecting side.

2. The flange according to claim 1, wherein the third plane is located at an end of the flange plate in the first direction.

3. The flange according to claim 1, wherein the non-connecting side is an inner side of the flange and the connecting side is an outer side of the flange.

4. The flange according to claim 1, wherein the connecting side is an inner side of the flange and the non-connecting side is an outer side of the flange.

5. The flange according to claim 1, wherein a connection between the neck and the flange plate is continuous.

6. The flange according to claim 1, wherein the bulge includes a starting location between the first plane and the second plane, wherein the bulge extends from the neck in a radial direction at the starting location in a continuous manner.

7. The flange according to claim 6, wherein the bulge extends from the neck at the starting location in a substantially circular manner.

8. The flange according to claim 6, wherein the bulge extends from the neck at the starting location in a substantially elliptical manner.

9. The flange according to claim 1, wherein the bulge enlarges a diameter of the neck by an amount of about 0.1% to about 10%.

10. The flange according to claim 1, wherein the neck and the flange plate are integrally formed.

11. The flange according to claim 1, wherein a difference between the second plane and the third plane in the first direction is defined by a size of the connecting portion in the first direction.

12. The flange according to claim 1, wherein the flange is a flange for a tower of a wind energy system.

13. The flange according to claim 1, wherein the flange is disposed between a tower and a yaw bearing in a wind energy system.

14. A flange comprising:
a neck including an outer side, wherein the neck is configured to be connected to a flange plate;
a flange plate including inwardly facing connecting portions for holding a connecting device;
an inner side and an outer side of the flange, wherein the inner side of the flange is located at a radially different location than the outer side of the flange; and
a ring-shaped bulge on the outer side of the flange defining a second diameter different from a first diameter of the outer side of the neck,
wherein a merge point of the bulge and the neck comprises a flange fillet.

15. The flange according to claim 14, wherein the bulge extends at least partially along the neck at the outer side.

16. The flange according to claim 15, wherein the bulge and the neck merge into one another in a continuous manner.

17. The flange according to claim 14, wherein the flange is configured for use in a tower of a wind energy system.

18. A wind energy system, comprising:
a tower configured to be connected to a nacelle of the wind energy system;
a yaw bearing on top of the tower;
a flange including a longitudinal axis, wherein the flange connects the yaw bearing and the tower, the flange comprising:
a neck extending substantially along a longitudinal axis of the flange defining a first direction;
a flange plate connected to the neck and including a connecting portion configured to hold a connecting device at a connecting side, the flange plate further including a non-connecting side being at a radially different location than the connecting side;
the flange including a first plane defining a first level of the neck, a second plane defining a second level where the flange plate and the neck are connected, and a third plane defining a third level of the flange plate, wherein the first plane, the second plane and the third plane extend substantially perpendicular to the longitudinal axis of the flange;
a ring-shaped bulge on the non-connecting side;
wherein the bulge extends from a fourth level, which is located between the first plane and the second plane, to the third plane;
a merge point of the bulge and the neck comprises a flange fillet, and
an outer diameter of the bulge is substantially constant along the non-connecting side.

19. The wind energy system according to claim 18, wherein the non-connecting side of the flange is an inner side of the flange and the connecting side is an outer side of the flange.

20. The wind energy system according to claim 18, wherein the bulge includes a starting location between the first plane and the second plane, wherein the bulge extends from the neck in a radial direction at the starting location in a continuous manner.

* * * * *